(12) United States Patent
Larson et al.

(10) Patent No.: US 12,078,267 B2
(45) Date of Patent: Sep. 3, 2024

(54) COMPRESSION PIPE FITTING WITH WIDE RANGE GRIP RINGS

(71) Applicant: A. Y. McDonald Mfg. Co., Dubuque, IA (US)

(72) Inventors: Ryan F. Larson, Dubuque, IA (US); Thomas W. Hast, Dubuque, IA (US)

(73) Assignee: A. Y. McDonald Mfg. Co., Dubuque, IA (US)

( * ) Notice: Subject to any disclaimer, the term of this patent is extended or adjusted under 35 U.S.C. 154(b) by 0 days.

(21) Appl. No.: 18/137,041

(22) Filed: Apr. 20, 2023

(65) Prior Publication Data

US 2023/0250903 A1    Aug. 10, 2023

Related U.S. Application Data

(63) Continuation of application No. 17/321,097, filed on May 14, 2021, now Pat. No. 11,635,159, which is a
(Continued)

(51) Int. Cl.
*F16L 19/12* (2006.01)
*F16L 19/075* (2006.01)
(Continued)

(52) U.S. Cl.
CPC ............. *F16L 19/12* (2013.01); *F16L 19/075* (2013.01); *F16L 19/086* (2013.01);
(Continued)

(58) Field of Classification Search
CPC ....... F16L 19/12; F16L 19/103; F16L 19/106; F16L 19/08; F16L 19/061; F16L 19/06; F16L 19/065; F16L 19/086; F16L 37/091
See application file for complete search history.

(56) References Cited

U.S. PATENT DOCUMENTS 2,201,372 A * 5/1940 Miller .................. F16L 37/091
285/337
2,255,673 A * 9/1941 McDermett ............ F16L 19/06
285/382.7
(Continued)

FOREIGN PATENT DOCUMENTS

DE    1016990 B    10/1957
FR    1543877 A    10/1968
(Continued)

OTHER PUBLICATIONS

A. Y McDonald Mfg. Co. Submittal Data Sheet—NL Service Fitting—74758-22-44.
(Continued)

*Primary Examiner* — David Bochna
(74) *Attorney, Agent, or Firm* — Wood, Phillips, Katz, Clark & Mortimer

(57) ABSTRACT

Compression fittings for pipes having a range of diameters, including a support body with a central section between end sections, the central section having a smaller diameter than the end sections, with a transition surface between the central section and each end section. A gasket fits over a pipe and engages one of the support body end section end surfaces. A fitting nut is movable axially over the support body to draw the support body and the gasket together in the axial direction and bias the gasket radially inward against the pipe. A grip ring encircles the pipe at one gasket end and has a surface engaging the fitting nut whereby the fitting nut biases the grip ring radially inwardly toward the pipe. An insert adapter has a hub with a radially extending flange may block the other gasket end to load the gasket between its axial ends.

16 Claims, 12 Drawing Sheets

Related U.S. Application Data continuation of application No. 15/940,149, filed on Mar. 29, 2018, now Pat. No. 11,015,748.

(60) Provisional application No. 62/479,990, filed on Mar. 31, 2017, provisional application No. 62/479,928, filed on Mar. 31, 2017.

(51) Int. Cl.
| | |
|---|---|
| *F16L 19/08* | (2006.01) |
| *F16L 19/10* | (2006.01) |
| *F16L 25/14* | (2006.01) |
| *F16L 19/06* | (2006.01) |

(52) U.S. Cl.
CPC .......... *F16L 19/103* (2013.01); *F16L 19/106* (2013.01); *F16L 25/14* (2013.01); *F16L 19/061* (2013.01)

(56) References Cited

U.S. PATENT DOCUMENTS

| | | | |
|---|---|---|---|
| 2,358,408 A | 9/1944 | McMurray | |
| 2,394,351 A | 2/1946 | Wurzburger | |
| 2,437,632 A | 3/1948 | Wolfram | |
| 2,452,277 A * | 10/1948 | Woodling | F16L 19/12 |
| | | | 285/348 |
| 2,470,546 A | 5/1949 | Carlson | |
| 2,513,115 A * | 6/1950 | Sprigg | F16L 33/224 |
| | | | 285/259 |
| 2,585,453 A | 2/1952 | Gallagher et al. | |
| 2,755,111 A | 7/1956 | Newell et al. | |
| 2,757,943 A | 8/1956 | Henderson | |
| 2,787,479 A | 4/1957 | Burns | |
| 3,486,775 A | 12/1969 | Callahan, Jr. et al. | |
| 3,915,478 A | 10/1975 | Al et al. | |
| 5,308,122 A | 5/1994 | Crawford et al. | |
| 5,466,019 A | 11/1995 | Komolrochanaporn | |
| 5,593,186 A | 1/1997 | Harris | |
| 6,851,728 B2 * | 2/2005 | Minami | F16L 19/086 |
| | | | 285/342 |
| 7,374,212 B1 * | 5/2008 | Gretz | F16L 19/041 |
| | | | 285/341 |
| 8,474,877 B2 * | 7/2013 | Smith | F16L 37/091 |
| | | | 285/305 |
| 8,764,069 B2 | 7/2014 | Newall et al. | |
| 9,383,049 B2 | 7/2016 | Stratulat et al. | |
| 9,897,238 B2 | 2/2018 | Peirce | |
| 11,015,748 B2 | 5/2021 | Larson et al. | |
| 2004/0090067 A1 * | 5/2004 | Pridham | F16L 19/086 |
| | | | 285/382.7 |
| 2005/0248152 A1 * | 11/2005 | Viegener | F16L 37/091 |
| | | | 285/307 |
| 2019/0024827 A1 * | 1/2019 | Ruissen | F16L 37/091 |

FOREIGN PATENT DOCUMENTS

| | | |
|---|---|---|
| GB | 2007791 A | 5/1979 |
| GB | 2011001 A | 7/1979 |

OTHER PUBLICATIONS

A. Y. McDonald Mfg. Co. Submittal Data Sheet—NL Service Fitting—74758Q-3Q.

\* cited by examiner

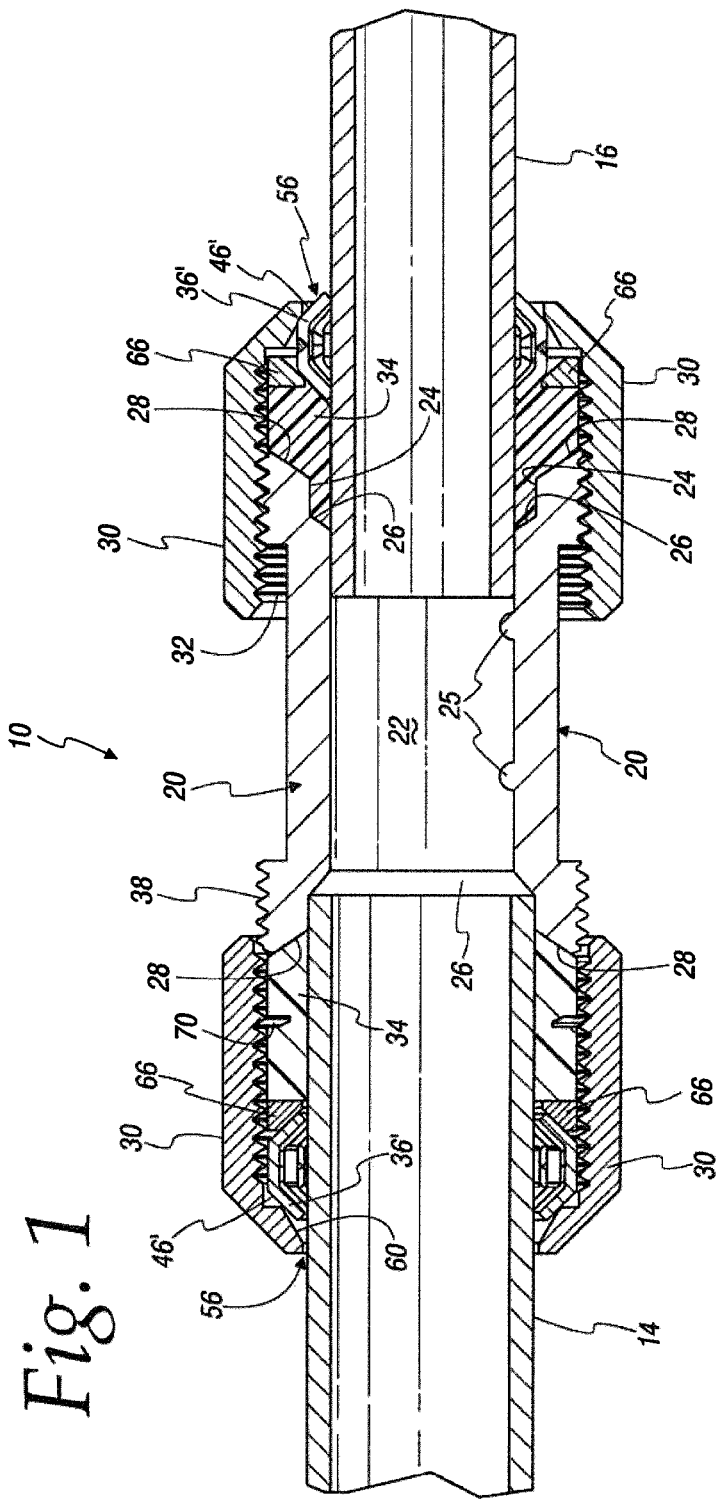

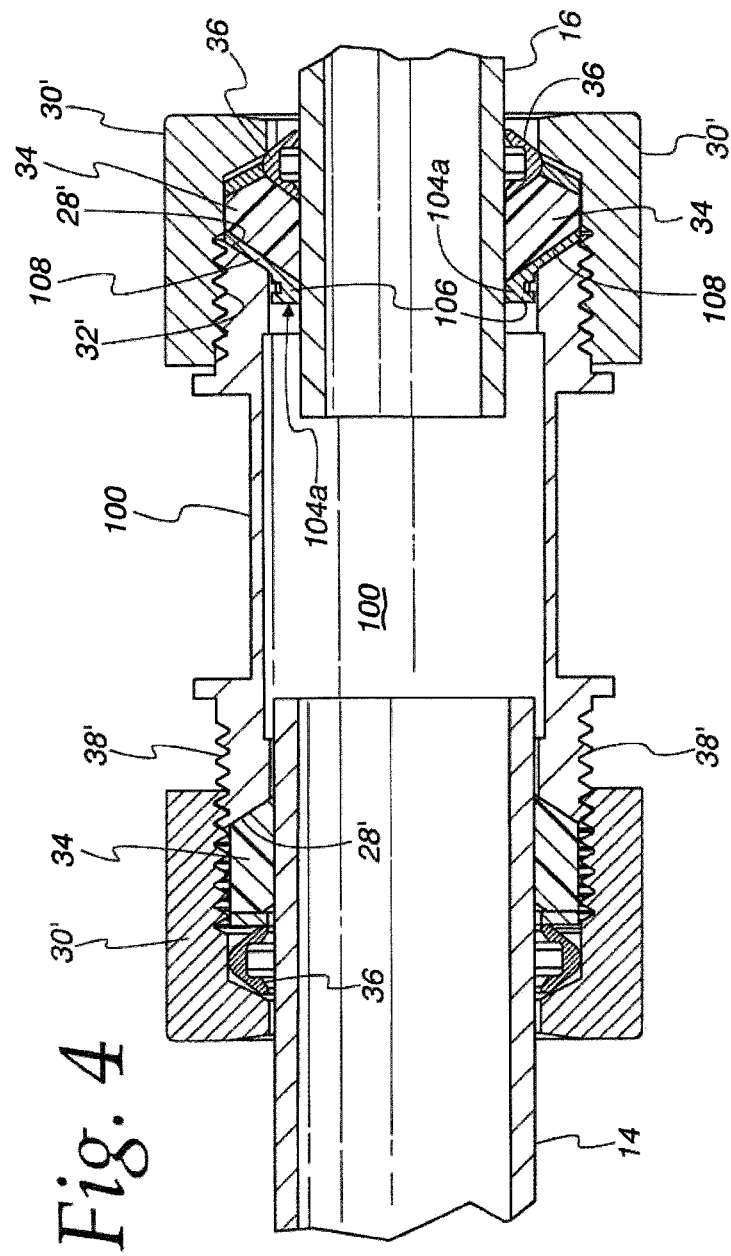

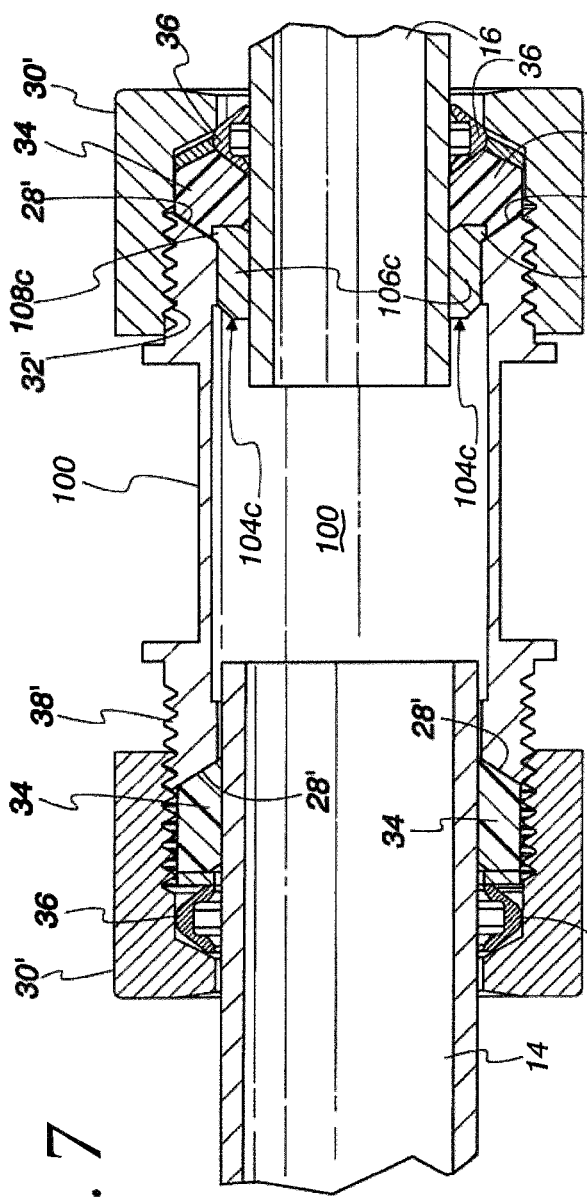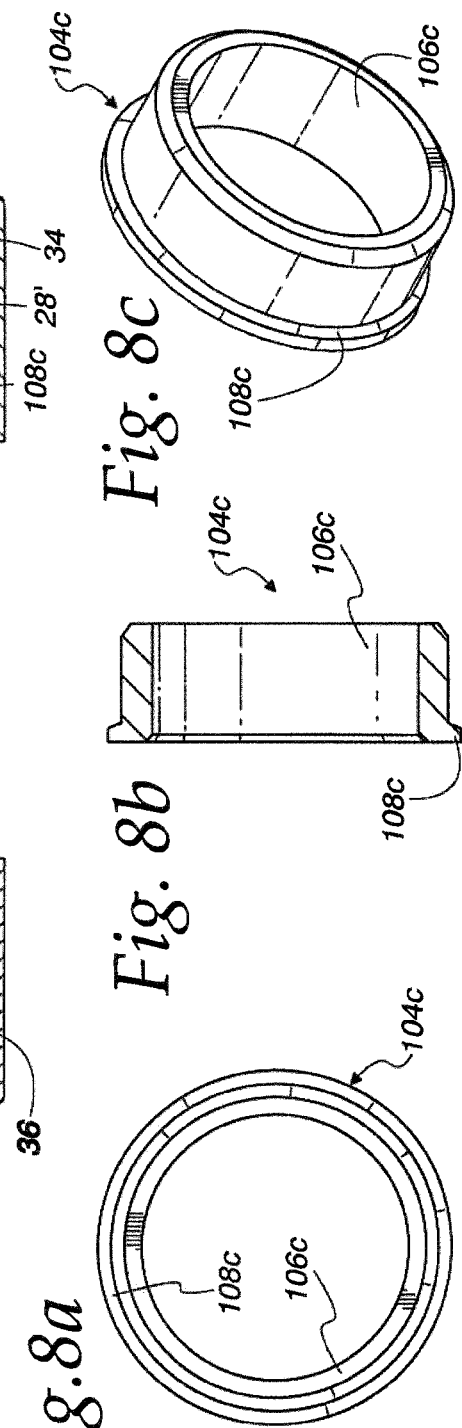

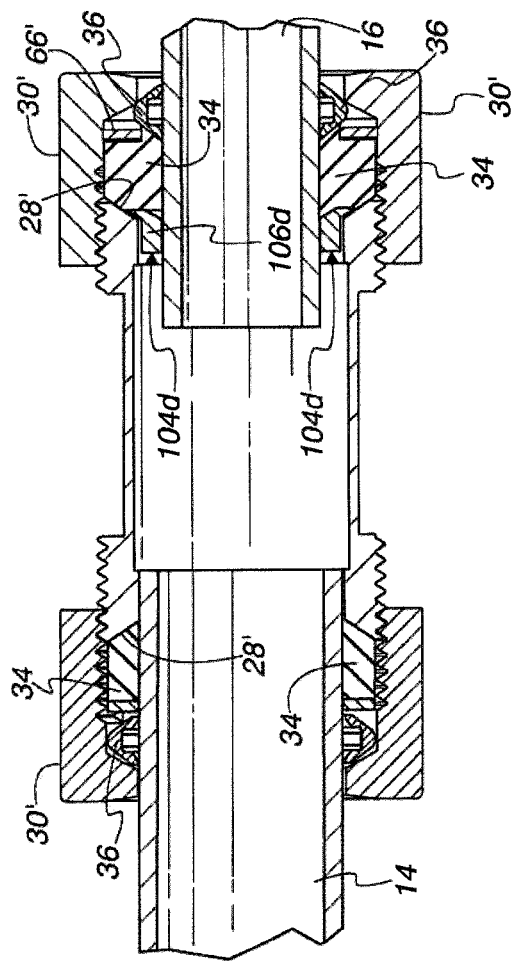
Fig. 9
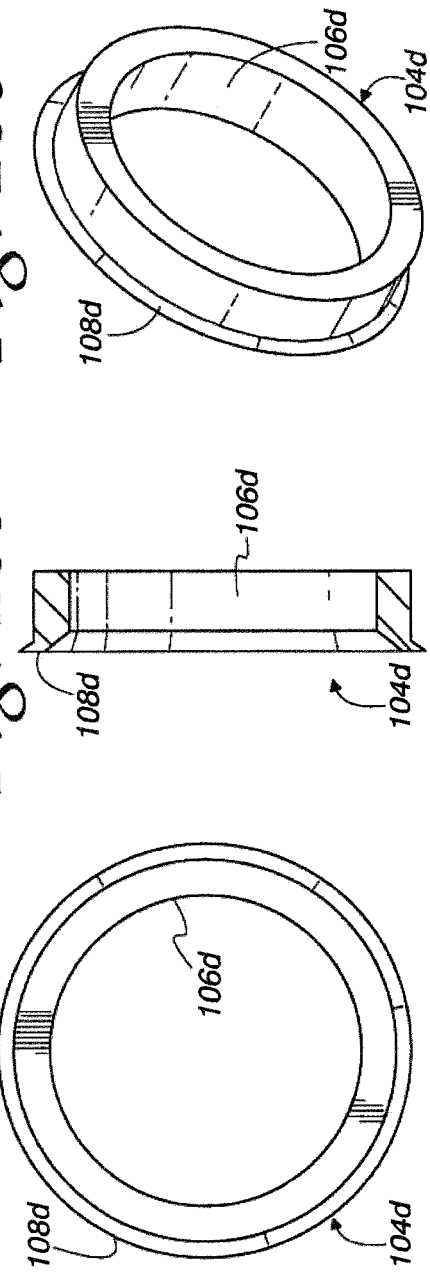
Fig. 10c
Fig. 10b
Fig. 10a

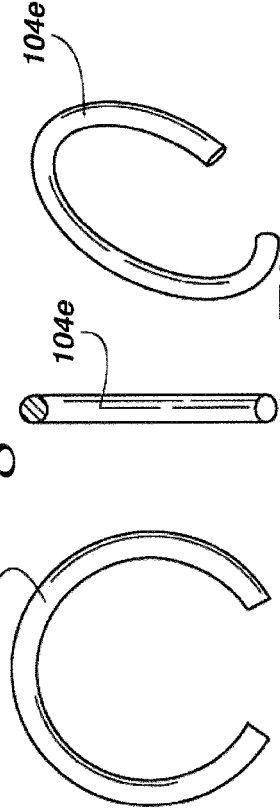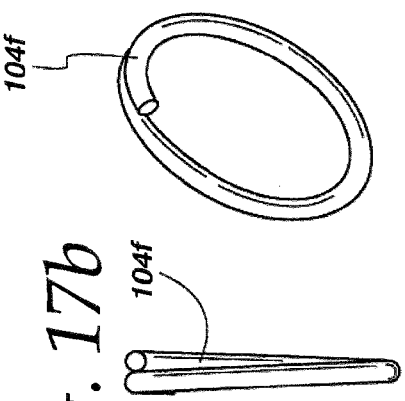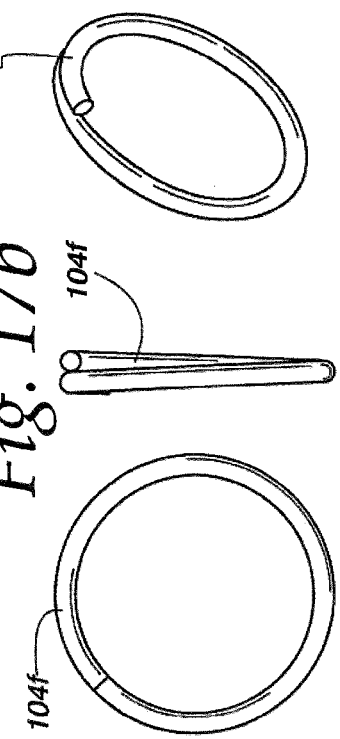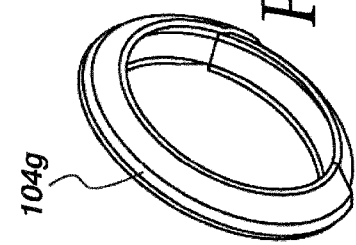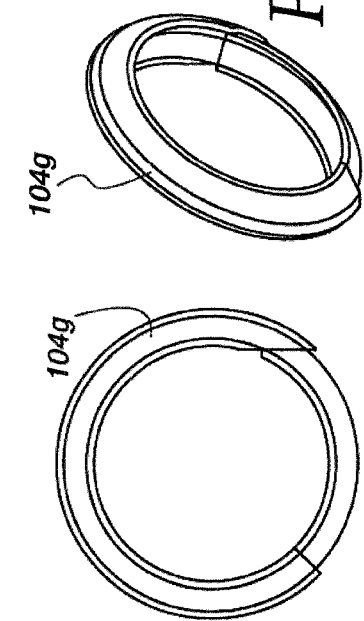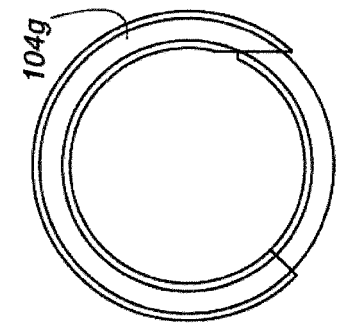

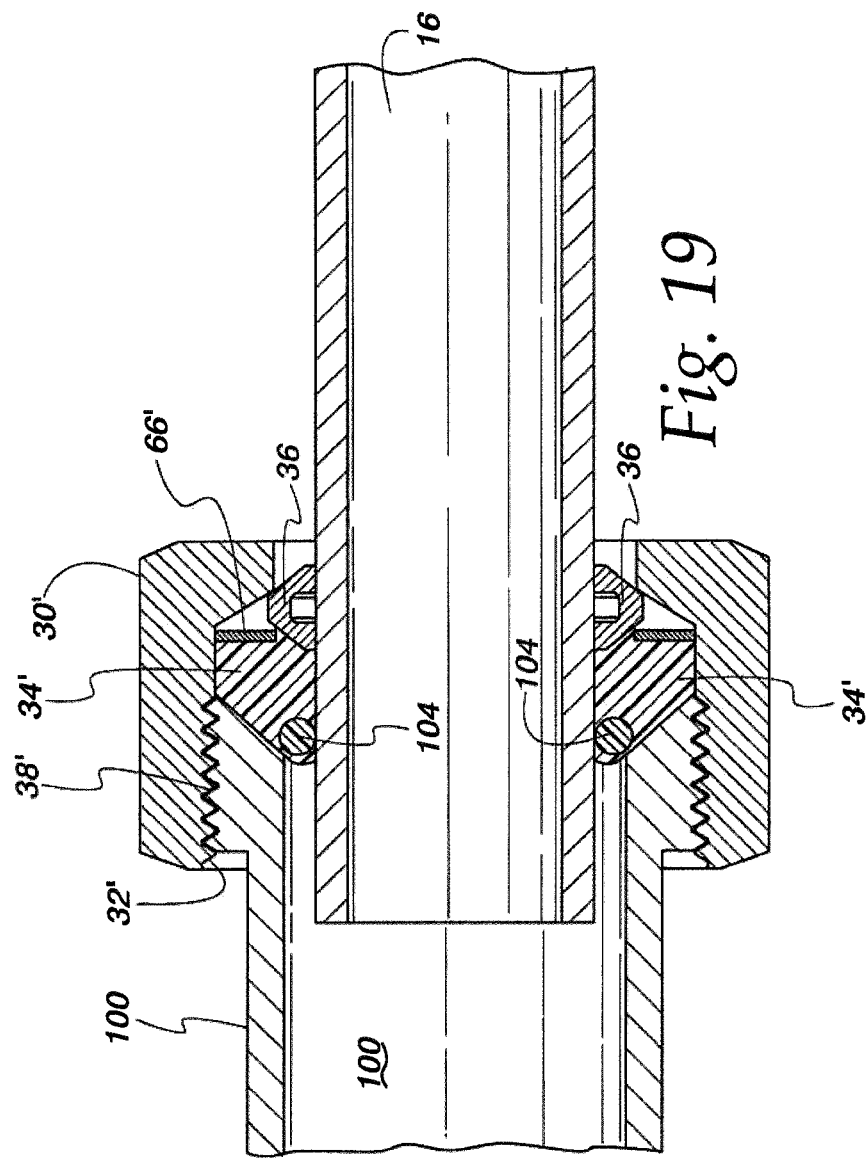

COMPRESSION PIPE FITTING WITH WIDE RANGE GRIP RINGS

CROSS-REFERENCE TO RELATED APPLICATIONS

This application is a Continuation of application Ser. No. 17/321,097, filed May 14, 2021, now U.S. Pat. No. 11,635,159, which is a Continuation of application Ser. No. 15/940,149, filed on Mar. 29, 2018, now U.S. Pat. No. 11,015,748, which claims priority to Provisional application Nos. 62/479,990 and 62/479,928, both filed on Mar. 31, 2017. The disclosure of all of the referenced related patent applications is hereby incorporated by reference in their entirety. Additionally, this application claims priority to the filing dates of all of the referenced related patent applications.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to fittings used to connect piping or tubing systems which contain fluids, gases, or conduits which contain electric wires.

BACKGROUND OF THE INVENTION

Existing compression pipe fittings used for connecting pipes which are designed with grip rings are typically supported and driven closed by rubber gaskets. These fittings are also typically designed for one diameter or pipe material. If incorrect pipes with smaller diameters are installed with a fitting intended for larger diameter pipes, the grip ring may not engage the pipe and the rubber gasket will tend to escape through the gap between the pipe and internal fitting walls. The resulting unloaded gasket may not maintain the desired seal around the pipe (resulting in fluid leaks) and also will not compress the grip ring (resulting in undesirable pipe movement).

Fittings have also been used which may accommodate a range of pipe diameters, utilizing grip rings and oversized gaskets which are less likely to escape from the fitting under load but result in physically larger fitting ends which are more expensive when made from metal, or less robust when made from plastics.

The present invention is intended to improve upon such fittings by providing a low-profile fitting which can accommodate a wide range of pipe diameters while properly restraining gasket and pipe movement allowing and preventing ring unloading, gasket unloading and leaks.

SUMMARY OF THE INVENTION

In one aspect of the disclosed advantageous compression fittings for connecting a selected one of pipes having a range of outer diameters between a maximum diameter and a minimum diameter, the fitting is provided with a support body substantially tubular around an axis and having a central body section between opposite end sections. The central body section has an inner surface with a first diameter substantially equal to the minimum diameter, with each of the support body opposite end sections having an inner surface having a second diameter substantially equal to the maximum diameter, and an end face. A transition surface is between the central body section inner surface and each of the support body end section inner surfaces. At least one gasket is adapted to fit over one of the first and second pipes and engage one of the support body end section end surfaces. At least one fitting nut is movable axially over the support body to a compression fitting position whereby axially moving the fitting nut draws the support body and the gasket together in the axial direction and biases the gasket radially inward against the selected pipe.

In one form of this aspect of the disclosed compression fittings, the transition surface is substantially conical along and around the axis.

In another form of this aspect of the disclosed compression fittings, the support body end section end surfaces are tapered outwardly from the support body end section inner surface to the end section outer surface, the end face being substantially conical along and around the axis.

In still another form of this aspect of the disclosed compression fittings, the support body has a threaded outer surface and the fitting nut includes an inner thread adapted to engage the threaded outer surface of the at least one support body end section whereby threading the fitting nut onto the end section threaded outer surface draws the support body and the gasket together in the axial direction and biases the gasket inward radially against the selected pipe.

In yet another form of this aspect of the disclosed compression fittings, a grip ring encircles the selected pipe, the grip ring having a surface engaging the fitting nut whereby axial movement of the fitting nut over the support body biases the grip ring radially inwardly toward the selected pipe. In a further form, the fitting nut at an axial end has a surface tapered to a reduced inner diameter around the selected pipe, and the grip ring has a sloped surface engaging the fitting nut tapered surface whereby axial movement of the fitting nut when threaded onto the end section threaded outer surface biases the grip ring radially inwardly toward the selected pipe. In a still further form, the grip ring has an outer annular spine with radially inwardly extending sides, the fitting nut has a minimum diameter at its end engaging the grip ring, and when the grip ring is biased inwardly against the selected pipe, the grip ring spline and sides have a minimum radial height which is greater than half of the difference between the minimum fitting nut diameter and the outer diameter of the selected pipe. In a yet further form, cuts through the grip ring sides facilitate bending of the grip ring into engagement with the outer diameter of the selected pipe.

In still another form of this aspect of the disclosed compression fittings, the gasket has a relief extending radially inwardly from it outer surface and extending around the gasket whereby compressing the gasket in an axial direction results in a difference in compressive forces along the radial dimension of the gasket to increase inward radial force of the gasket.

In another aspect of the disclosed advantageous compression fittings for connecting a first pipe to a second pipe, the first pipe having an outer first diameter and the second pipe having an outer second diameter, the first diameter being equal to or greater than the second diameter, a support body is substantially tubular around an axis and having a central body section between opposite end sections. The central body section has an inner surface with a third diameter equal to or greater than the second diameter. Each of the support body opposite end sections have an inner surface having a fourth diameter greater than the third diameter and equal to or greater than the first diameter, and an end face. A transition surface is between the central body section inner surface and each of the support body end section inner surfaces. At least one gasket adapted to fit over one of the first and second pipes, and at least one fitting nut is movable axially over the support body to a compression fitting position whereby axially moving the fitting nut draws the support body and the gasket together in the axial direction and biases the gasket radially inward against the selected pipe.

In one form of this aspect of the disclosed compression fittings, the support body end section end faces are tapered outwardly from the support body end section inner surface to the end section outer surface. In a further form, the end face is substantially conical along and around the axis. In another further form, the taper of the end faces is not uniform in an axial direction and in a still another further form, the gasket has a tapered end face shaped to substantially mate with the end face at least one of the support body end sections.

In another form of this aspect of the disclosed compression fittings, the support body end section transition surfaces between the central body section inner surface and each of the support body end section inner surfaces are substantially conical along and around the axis.

In still another aspect of the disclosed advantageous compression fittings for connecting a selected one of pipes having a range of outer diameters between a maximum diameter and a minimum diameter, a support body is substantially tubular around an axis with an inner surface having a selected inner diameter, the support body having a face on at least one axial end tapered outwardly from the support body inner surface, the end face being substantially conical along and around the axis. At least one gasket is adapted to fit over the selected pipe, and at least one fitting nut is movable axially over the support body to a compression fitting position. A grip ring encircles the selected pipe and engages the fitting nut whereby axial movement of the fitting nut toward the compression fitting position biases the grip ring radially inwardly toward the selected pipe. A blocking member is around the selected pipe and adjacent the support body tapered end, whereby axially moving the fitting nut draws the support body axially toward the grip ring and biases the gasket radially inwardly against the selected pipe, and the blocking member blocks any gap between the pipe outer diameter and the support body inner surface to prevent unloading of the gasket.

In one form of this aspect of the disclosed compression fittings, a radial gap is defined between the selected pipe and the fitting nut where engaging the grip ring, and the grip ring, when biased inwardly against the selected pipe, has a radial height which is greater than the radial gap between the selected pipe and the fitting nut.

In another form of this aspect of the disclosed compression fittings, the grip ring has a sloped surface engaging a tapered surface of the fitting nut whereby axial movement of the fitting nut biases the grip ring radially inwardly toward the selected pipe.

In still another form of this aspect of the disclosed compression fittings, the blocking member is a support ring encircling the pipe outer surface when the gasket is loaded by moving the fitting nut axially onto or into the support body. In one further form, the blocking member has a radial dimension relative to the axis greater than the radial dimension of the gap. In another further form, the support ring is embedded in the gasket. In still another further form, the support ring extends at least about 360 degrees around the pipe when the gasket is loaded. In yet another further form, the blocking body is an insert adapter including a central hub disposed in the gap between the pipe outer diameter and the support body inner surface, and a flange extending radially outwardly from the central hub, where the flange has an outer diameter greater than the inner diameter of the support body whereby the flange is disposed between the gasket and the support body end face. In a further form, the insert adapter flange has an outer diameter substantially as great as the outer diameter of the support body end face and, in another further form, the insert adapter flange is tapered in a conical shape about the pipe at an angle substantially the same as the taper of the support body end face.

In yet another form of this aspect of the disclosed compression fittings, the blocking member is of a material of sufficient hardness to prevent the blocking member from being distorted sufficiently to be forced through the gap when loading the gasket.

In still another form of this aspect of the disclosed compression fittings, the gasket has a relief extending radially inwardly from it outer surface and extending around the gasket whereby loading of the gasket results in a difference in compressive forces along the radial dimension of the gasket to increase inward radial force of the gasket.

In yet another form of this aspect of the disclosed compression fittings, the grip ring in transverse cross-section has a V-shape with the point of the V facing away from the pipe and the ends of the legs of the V biased toward the pipe. In a further form, the ends of the radially inwardly extending legs of the V-shaped grip ring are pointed whereby the pointed leg ends dig into the outer diameter of the selected pipe to anchor the grip ring in the axial direction to the selected pipe. In another further form, cuts through the grip ring in an axial direction, the cuts facilitating bending of the grip ring into engagement with the outer diameter of the selected pipe.

In another form of this aspect of the disclosed compression fittings, the selected pipe is a cylindrical connection to a selected one of a valve, adapter, nipple, pipe end, elbow, meter, meter setter, yoke fitting and pump.

In still another form of this aspect of the disclosed compression fittings, the outer thread is on the support body.

In yet another form of this aspect of the disclosed compression fittings, the grip ring is asymmetrical about the selected pipe with one end having a first diameter and its other end having a second diameter less than the first diameter, wherein the grip ring one end is received in an annular groove in the one fitting nut and the other end is adjacent the gasket.

In yet another aspect of the disclosed advantageous compression fittings for connecting a selected one of pipes having a range of outer diameters between a maximum diameter and a minimum diameter, a support body is substantially tubular around an axis with an inner surface having a selected inner diameter, the support body having a face on at least one axial end. At least one gasket is adapted to fit over the selected pipe, and at least one fitting nut is adapted to move axially relative to the support body, the fitting nut at its axial end having an end surface tapered to a reduced inner diameter around the selected pipe. A grip ring encircles the selected pipe and engages the fitting nut whereby axial movement of the fitting nut onto the support body biases the grip ring radially inwardly toward the selected pipe. A blocking member is around the selected pipe and adjacent the support body end face, whereby axially moving the fitting nut to a compression fitting position draws the support body and the grip ring together in the axial direction and loads the gasket to bias the gasket inward radially against the selected pipe, and the blocking member blocks any gap between the pipe outer diameter and the support body inner surface to prevent unloading of the gasket.

In one form of this aspect of the disclosed compression fittings, the support body end face is tapered outwardly from the support body inner surface, the end face being substantially conical along and around the axis.

In another form of this aspect of the disclosed compression fittings, the fitting nut at an axial end has a surface tapered to a reduced inner diameter around the selected pipe, and the grip ring has a sloped surface engaging the fitting nut tapered surface whereby axial movement of the fitting nut biases the grip ring radially inwardly toward the selected pipe.

In still another form of this aspect of the disclosed compression fittings, the fitting nut at an axial end has a surface tapered to a reduced inner diameter around the selected pipe, and the blocking member has an outer flange which is tapered substantially the same as the taper of the fitting nut axial end surface.

Other objects, features, and advantages of the invention will become apparent from a review of the entire specification, including the appended claims and drawings.

BRIEF DESCRIPTION OF THE DRAWINGS

FIG. 1 is a cross-sectional view of one embodiment of an improved compression fitting, with a stepped coupling body;

FIG. 4 is a cross-sectional view of a second embodiment of an improved compression fitting, with a support body and blocking member;

FIG. 7 is a cross-sectional view of a third embodiment of an improved compression fitting, including a coupling body as in the FIG. 4 embodiment;

FIGS. 8*a*-8*c* illustrate a third embodiment of a blocking member, the member being an insert adapter illustrated in FIG. 7, with FIG. 8*a* being a front view, FIG. 8*b* being a cross-sectional view and FIG. 8*c* being a perspective view;

FIG. 9 is a cross-sectional view of a fourth embodiment of an improved compression fitting, including a coupling body as in the FIG. 1 embodiment;

FIGS. 10*a*-10*c* illustrate a fourth embodiment of a blocking member, the member being an insert adapter illustrated in FIG. 9, with FIG. 10*a* being a front view, FIG. 10*b* being a cross-sectional view and FIG. 10*c* being a perspective view;

FIGS. 16*a*-16*c* are front, cross-sectional and perspective views of one support ring which may be used as a blocking member;

FIGS. 17*a*-17*c* are front, side, and perspective views of a second support ring which may be used as a blocking member;

FIGS. 18*a*-18*b* are front and perspective views of a third support ring which may be used as a blocking member; and FIG. 19 is a cross-sectional view of a compression fitting similar to FIG. 4 but including a support member such as illustrated in FIGS. 16*a*-16*c* or 17*a*-17*c*.

DETAILED DESCRIPTION OF ADVANTAGEOUS EMBODIMENTS

Figure 3:
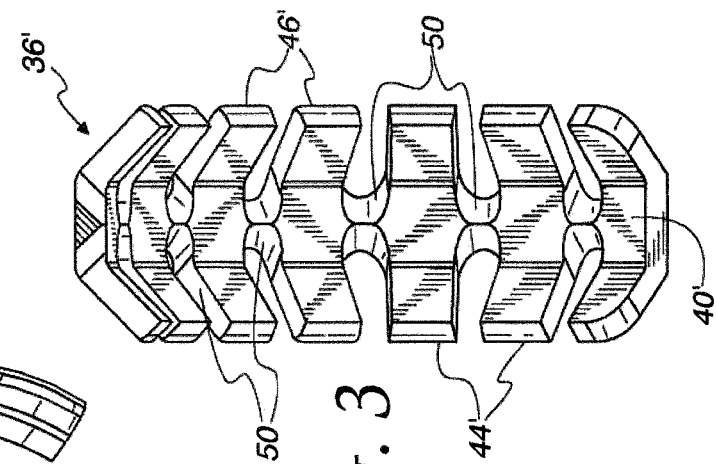
FIG. 3 is a perspective view of a portion of an alternative embodiment of a grip ring.
Figure 2C:
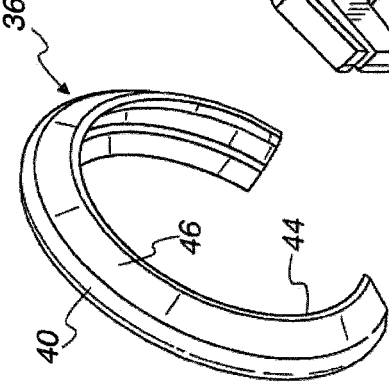
FIGS. 2*a*-2*d* are various views of a grip ring which may be used with the compression fittings of the present invention, with FIG. 2*a* being a cross-section, FIG. 2*b* being from 90 degrees relative to FIG. 2*a*, FIG. 2*c* being a perspective view, and FIG. 2*d* being an enlarged cross-sectional view of the top of FIG. 2*a*.
Figure 2B:
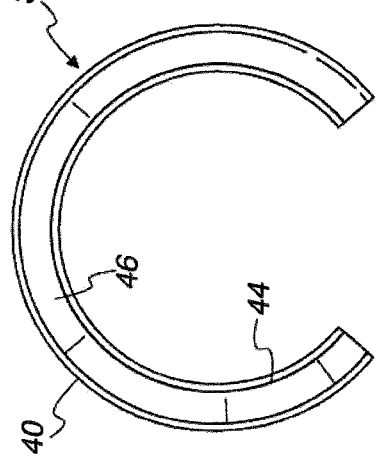
Figure 2D:
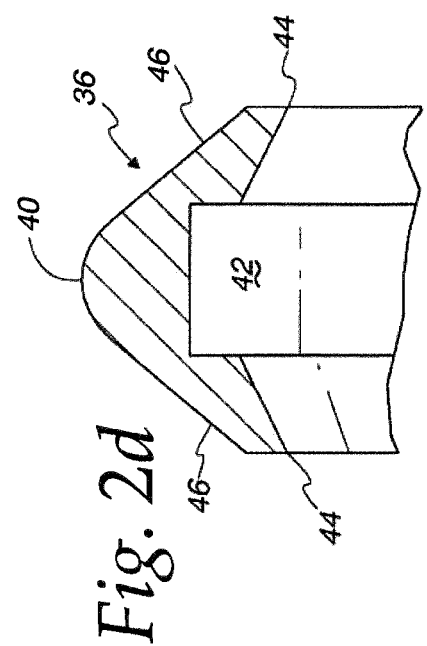
Figure 2A:
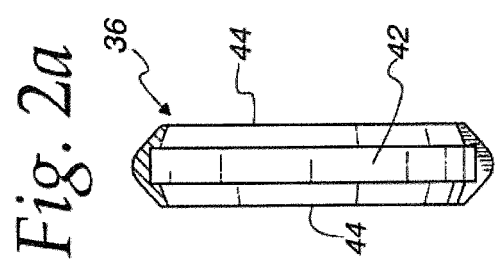

FIG. 1 illustrates one advantageous fitting 10 able to connect pipes of varying dimensions. Specifically, as illustrated, the fitting 10 connects a large diameter pipe 14 to a small diameter pipe 16 by use of, inter alia, a coupling body or internal gasket support body 20. As used herein and claimed, it should appreciated that references to "pipes" include piping and/or tubing systems (which contain, e.g., fluids and/or gases), conduits (which contain, e.g., electric wires, etc.) and the like.

The support body 20 is generally tubular with a round stepped interior consisting of a central body section or step 22 between end steps 24. The central step 22 has an internal diameter which is less than the internal diameter of the end steps 24. Stops 25 may optionally be provided in the inner surface of the central step 22 to limit movement of minimum radius pipes into the coupling or support body 20. Tapered or sloped sections 26 provide a stepped transition between the central and end steps 22, 24. The outer axially facing ends 28 of the support body 20 are similarly sloped or tapered. As will be apparent, the support body 20 may be used to connect pipes having outer diameters ranging from the inner diameter of the central step 22 up to the inner diameter of the end steps 24.

When connecting pipes 14, 16 as illustrated in FIG. 1, a fitting nut 30 with internal threads 32, gasket 34 and a grip ring 36 are located around the ends of the pipes 14, 16, and the pipe ends are fitted into the support body 20 The support body 20 has outer threads 38 on each end onto which the internal threads 32 of the fitting nuts 30 may be screwed to draw the fitting nuts 30 over the support body 20 and toward one another.

The gaskets 34 may be made of elastomeric material or the like, including but not limited to EPDM or Nitrile Rubber which would function suitably as further described herein.

FIGS. 2a-2d and 3 illustrate two suitable grip ring configurations. As illustrated in FIGS. 2a-2d, the grip ring 36 may be C-shaped having a central outer spine 40 with a central relief 42 and inner diameter points 44, including sloped or tapered sides 46 between the outer spine 40 and the points 44 as shown in cross-section, symmetrically on opposite sides of the spine 40 (see FIG. 2d).

As will become apparent, the points 44 are intended to grip the outer wall of the associated pipe 14 or 16. This cross-sectional shape can be designated as an "A" or Arch Profile, with the grip ring 36 having a V-shaped cross section (see FIG. 2d) with its pointed end facing radially outwardly. The spine 40 or pointed end of the V functions as a hinge point between the sides, and the central relief 42 may both improve the sharpness of the radially inner edge of the sides 46 and reduce the amount of force required to collapse the ring shape onto the pipe 14, 16.

It should be appreciated that variations to the illustrated grip rings of FIGS. 2a-2d may be advantageously used.

For example, only one side 46 may be tapered (though taper on both sides is advantageous in ensuring that the grip ring 36 will function properly no matter which direction it is put on the pipe, thereby preventing backwards installation).

Further, the grip ring 36' may include cut outs or reliefs 50 in the sloped sides 46 and into the spine 40 so that circumferentially spaced, separate ribs or teeth 46' extend from the spine 40' as illustrated in FIG. 3. Such cut outs function to reduce the force required to fit the ring 36' on and around the pipe 14, 16. Alternatively, cut outs may be provided in the spine and part of the tapered sides so that the C-shape is maintained by material extending continuously around the area of the inner points. Still further, it should be recognized that the grip ring 36 could, within at least some advantages disclosed herein, extend a full 360 degrees, or even more with overlapping ends. (Note that as used herein, various similar components in different Figures have been given the same reference number when identical but used in different combinations with other components, and where such components are functionally similar but not identical, the same reference numbers have been used, but with a prime ['] or letters ["a", "b", "c", . . . ] added to the numbers).

It should be appreciated that the radial height of the grip ring tapered sides 46 or ribs/teeth 46' should be greater than the gap 56 between the pipe 16 and the end of the fitting nut 30 when the smallest approved diameter pipe is installed into the fitting to ensure that they do not rotate at the hinge point of the spine 40 to the point where the ribs/teeth 46' are perpendicular to the outer wall of the pipe 14, 16, as if that were to occur the gasket 34 would no longer apply additional gripping force with additional nut compression. Rather, the rib/tooth length may advantageously maintain an acute angle with the pipe outer diameter even when used with the smallest design pipe. In that case, the ribs/teeth 46' not only grip the pipe 14, 16 but also prevent the gasket 34 from unloading and flowing between the gaps at the ribs/teeth 46' and then out through the gap 56 between the pipe and the end of the fitting nut 30.

The grip rings 36 may be made of any number of materials which would function suitably as described herein. For example, the grip rings 36 may be machined or formed from any number of materials including Brass, bronze, plastic or stainless steel. Further, the points 44 may or may not be sharpened. The relief 42, though not required in all aspects, may be provided to both improve the sharpness of the points and also to reduce the amount of force required to collapse the ring shape onto the pipe.

The sloped sides 46 of the grip ring 36 are designed to slide against the sloped mating surface 60 of the fitting nut 30 (see FIG. 1). The height of the grip ring 36 advantageously may be such that it will not escape through the gap 56 between the outer wall of the pipe 14, 16 and the fitting nut 30 when the smallest approved diameter pipe is installed into the fitting (e.g., see the right end of FIG. 1). Moreover, the height of the grip ring 36 further serves to block gaps of the grip ring height, allowing a large range of pipe diameters to be used with a compression fitting 10 and associated fitting nuts 30 without the gasket 34 escaping (or unloading) through such gaps.

When being secured, the fitting nut 30 may advantageously be screwed over and onto the outer threads 38 of the support body 20, causing the fitting nut 30 to translate axially toward the end of the pipe 14, 16 over which it is secured. As the fitting nut 30 translates axially, its engagement with the sloped side 46 of the grip ring 36 not only biases the grip ring 36 axially, but also exerts a radial force around the grip ring 36 toward the outer surface of the pipe 14, 16.

It should be appreciated that while threaded connections may be advantageously used to provide at least some advantages of the present invention, such inner and outer threads may be provided on different components to be secured together. Moreover, any structure whereby a fitting (such as the fitting nut 30) may be moved over the pipe 14, 16 in the direction of the pipe axis and then retained in a desired axial position, with or without threads, may be used to provide at least some aspects of the present invention As a result of these forces, the pointed ends 44 of the grip ring 36 are caused to grip the outside of the pipe 14, 16 with increasing force, including in some applications digging into the pipe surface sufficiently to essentially provide a fixed anchor for the assembly whereby the assembly will not slide axially along the pipe 14, 16 to which it is secured.

In the embodiment illustrated in FIG. 1 (and others), an optional washer 66 is provided on the outer or inner sloped side 46 of the grip ring 36, which washer 66 (or the inner sloped side 46 of the grip ring 36 absent the washer 66) will engage the outer end of the gasket 34. The washer 66, which may be flat or tapered, may be included to assist in driving the grip ring 36 for more even pipe engagement and consistent closure (i.e., the grip ring 36 will be biased inwardly by both the fitting nut surface 60 engaging one sloped side 46 of the grip ring 36 but also by the washer 66 engaging the other sloped side 46 of the grip ring 36).

Simultaneously, the tapered outer axially facing end 28 of the support body 20 (and the stepped transition sloped section 26 for smaller diameter pipes 16 such as illustrated in FIG. 1) engage the other end of the gasket 34 to both compress the gasket 34 axially and also compress it inwardly (radially) due to the taper or slope of the support body end 28. A relief notch 70 may also be provided around the gasket 34 (see the left side of FIG. 1) which advantageously causes the less compressive forces around the outer periphery of the gasket 34 than on the inner periphery, which differential results in an added inward radially force to further ensure tight sealing of the gasket 34 around the outer surface of the pipe 14.

Similarly, where the pipe 16 is smaller than the larger design diameter of this structure as illustrated at the right of FIG. 1, when compressed by tightening the fitting nut 30, the gasket 34 will flow below the end step 24 but ultimately is restrained by the transition surface 26 between the steps, to again provide a secure seal around the outer surface of the pipe 16 with the slope section 26 and sloped ends 28 causing the gasket 34 to tightly seal around the pipe 16. Moreover, the support geometry of the end step 24 secures the gasket and the support geometry of the central step 22 both secures the pipe 16 to prevent lateral movement and closes off the gap between the pipe 16 the support body 20 to prevent internal gasket unloading and associated fluid leakage.

FIGS. 4, 7 and 9 illustrate alternate embodiments in which assemblies having the fitting nuts 30 secured to the support bodies which are not stepped may be readily adapted to use for varying pipe diameters.

In accordance with some aspects of the advantageous compression fittings disclosed herein, in place of the stepped support body 20 such as described with respect to FIG. 1, a coupling or support body (or spacing sleeve) 100 without steps may be used with suitable blocking members to seal gaps between the support sleeve 100 and pipes 14, 16. This configuration enables compression fittings to be formed with pipes have a range of outer diameters using a support body 100 having a substantially uniform (non-stepped) inner diameter while still ensuring that the gasket 34 is retained in its loaded configuration providing a tight seal between the support body 100 and the pipe 14, 16 without leaking out through the gaps therebetween.

Various suitable blocking members 104 are illustrated in FIGS. 5a-5c, 6a-6c, 8a-8c, 10a-10c, 16a-16c, 17a-17c and 18a-18c. Advantageously, the blocking members may be machined or formed from any number of materials including but not limited to copper, brass, stainless steel, or plastic, it being advantageous that the blocking member be sufficiently hard that it will not be distorted from forces loading the gasket 34 and be forced out of the gap between the coupling body or spacing sleeve 100 and the pipe 14, 16. Further, the blocking members may advantageously have an outer diameter greater than the inner diameter of the support body 100 to further ensure that the gasket 34 will not be forced through the gap and unloaded and thereby also failing to provide the desired seal.

FIGS. 5a-5c and 6a-6c illustrate one type of suitable blocking member 104a, 104b. That blocking member is an insert adapter having a tubular central hub 106 with a tapered or conical flange 108 extending around the hub 106 to an outer diameter which is greater than the inner diameter of the coupling or spacer body 100. One (FIGS. 5a-5c) or more (FIGS. 6a-6c) grooves 110, 110' may be advantageously provided around the outer surface of the hub 106, with suitable O-rings 116 within the grooves 110, 110' (or gasket or other suitable sealing material, with or without a groove in the hub 106). It should be appreciated that the various blocking members as disclosed herein (104a, 104b, . . . 104g) could be interchangeably used in various compression fitting combinations such as disclosed herein.

Figure 5A:
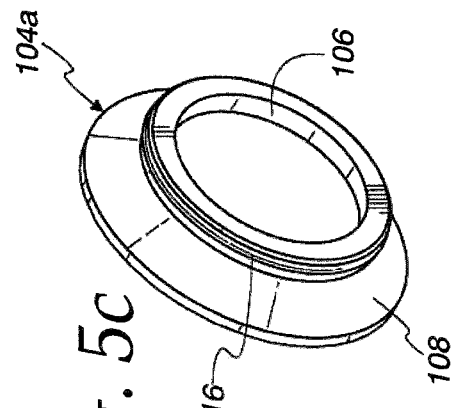
FIGS. 5*a*-5*c* illustrate one embodiment of a blocking member, the member being an insert adapter, with FIG. 5*a* being a front view, FIG. 5*b* being a cross-sectional view and FIG. 5*c* being a perspective view.
Figure 5B:
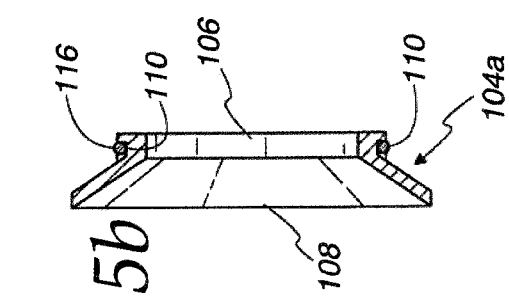
Figure 5C:
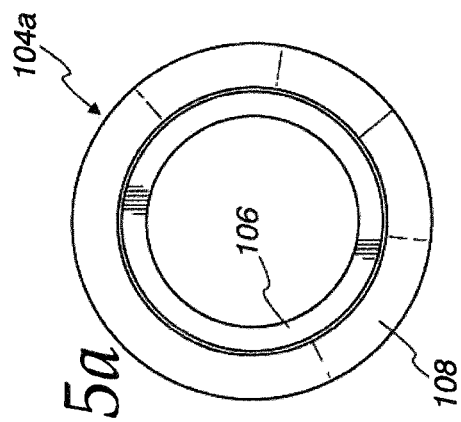
Figure 6A:
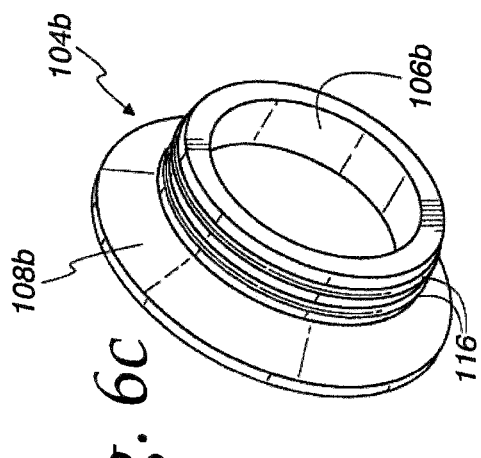
FIGS. 6*a*-6*c* illustrate a second embodiment of a blocking member, the member being an insert adapter, with FIG. 6*a* being a front view, FIG. 6*b* being a cross-sectional view and FIG. 6*c* being a perspective view.
Figure 6B:
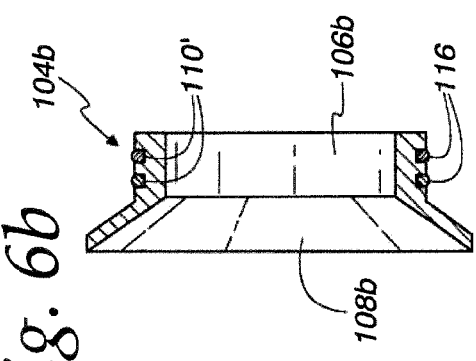
Figure 6C:
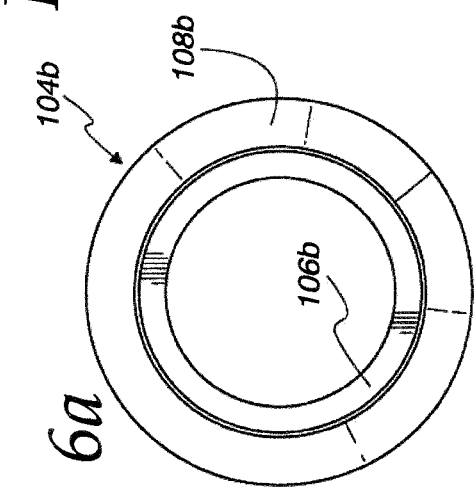

FIG. 4 illustrates a coupling body 100 which may be used with pipes having ranges of outer diameters less than the inner diameter of the support body 100 by use of the insert adapter 104a of FIGS. 5a-5c. Except as described below, the coupling assembly of FIG. 4 (and of FIGS. 7 and 9 discussed thereafter) function similarly as described above with respect to FIG. 1 (e.g., fitting nuts engage the grip rings to anchor the assemblies to the pipes 14, 16 as a result of being squeezed inwardly by the engagement of the tapered or sloped surfaces).

As illustrated in FIG. 4, when the assembly is secured to a maximum diameter pipe 14 (at the left in FIG. 4), the gap between the pipe outer surface and the inner diameter of the support body 100 is minimal. Therefore, when the fitting nut 30' is tightened over the support body 100, the gasket 34 will be compressed and tightened against the pipe outer surface sufficiently to maintain a seal without risk that the gasket 34 may leak through that gap.

However, where the assembly is secured to a pipe having a smaller than maximum diameter pipe 14 (as at the right in FIG. 4), the gap between the pipe outer surface and the inner diameter of the support body 100 may be so large that tightening the fitting nut 30' over the support body 100 will cause the gasket 34 to be squeezed out of the space where it is desired to seal. As disclosed herein, however, this problem may be avoided by use of an insert adapter such as previously described in connection with FIGS. 5a-5c and FIGS. 6a-6c. Specifically, the insert adapter 104, 104' will ensure that the gasket 34 will not squeeze out of the space where it is intended to seal, but rather will be compressed tightly around the pipe outer surface including by engagement by the taper of the conical flange 108. It should thus be appreciated that leaking past the inner tubular surface of the central hub 106 will be of no consequence because the gasket 34 provides a tight, reliable seal at that area, and leaking past the outside of the central hub 106 will be prevented by the O-ring(s) 116.

The compression fitting of FIG. 7 is similar to that of FIG. 4 but with the blocking member or insert adapter 104c of FIGS. 8a-8c. Insert adapter 104c is similar to the insert adapters 104a, 104b of FIGS. 5a-5c and 6a-6c except that the hub 106c extends further in the axial direction and the flange 108c does not extends outwardly as far in the radial direction. This greater axial dimension of the insert adapter 104c permits the hub 106c to more reliably seal in the gap, as well as providing a much greater resistance to unloading of the gasket 34 to any gap between the hub 106c, coupling or spacer body 100 and pipe 16. As such, this adapter 104c may not require a separate seal such as the O-ring of FIGS. 5a-5c and 6a-6c.

The compression fitting of FIG. 9 is similar to that of FIG. 7 but with the blocking member or insert adapter 104d of FIGS. 10a-10c. Insert adapter 104d is similar to the insert adapter 104c, 104c of FIGS. 8a-8 except that the flange 108d tapers to a point at its radially outer end.

Figure 11:
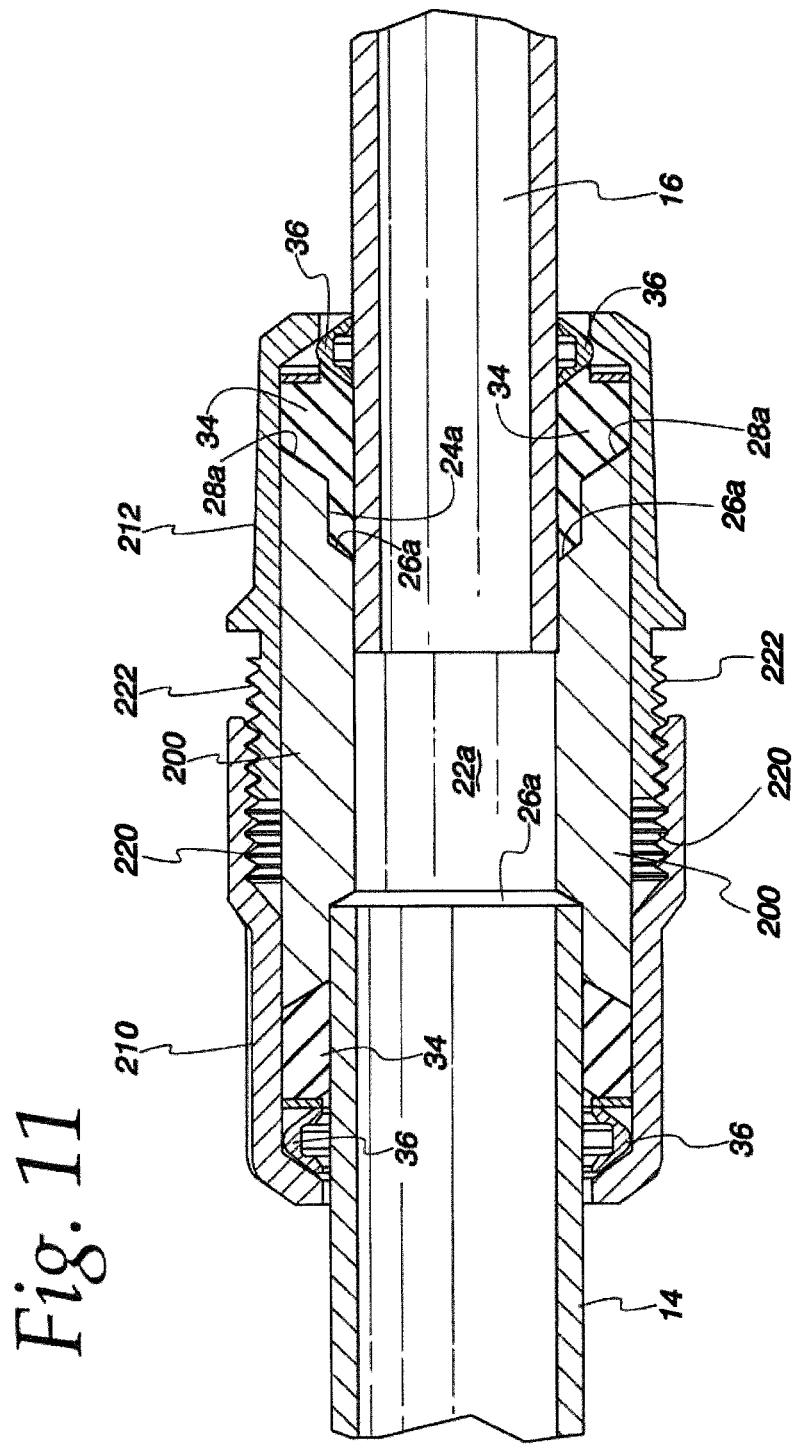
FIG. 11 is a cross-sectional view of a fifth embodiment of an improved compression fitting, with a stepped support body or spacing sleeve and the fitting nuts secured together.
Figure 12:
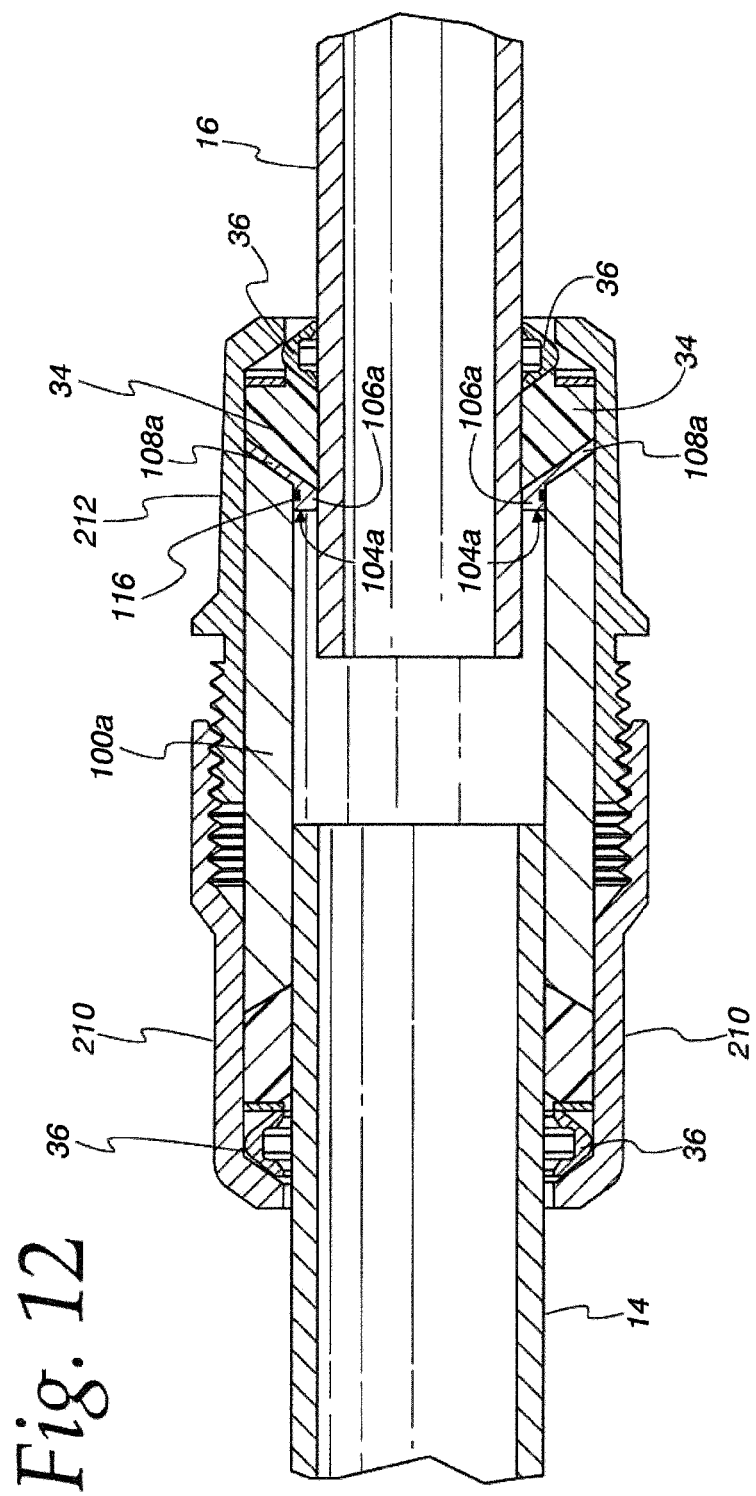
FIG. 12 is a cross-sectional view of a sixth embodiment of an improved compression fitting, with a straight support body or spacing sleeve, a blocking member and the fitting nuts secured together.

FIGS. 11-12 illustrate still further compression fittings embodying at least some of the advantages of the fittings disclosed herein.

Specifically, FIG. 11 shows a compression fitting wherein the support body or spacing sleeve 200 is stepped such as the FIG. 1 fitting, but rather than the fitting nuts 210, 212 being each threaded onto the coupling body, the fitting nuts 210, 212 have threads 220, 222 which are screwed together over the spacing sleeve 200. In such a configuration, which securing two pipes 14, 16 together, the spacing sleeve 200 essentially floats with the loading pressure applied between the axial ends of the nuts 210, 212, which can tend to distribute the axial forces equally between both fitting connections.

FIG. 12 shows a compression fitting similar to FIG. 11 (i.e., with the fitting nuts 210, 212 secured directly to each other, with the coupling body "floating" therebetween), and with a non-stepped spacing sleeve 100a using blocking members such as illustrated in FIGS. 4, 7 and 9, and specifically the insert adapter 104a of FIGS. 5a-5c.

Figure 13:
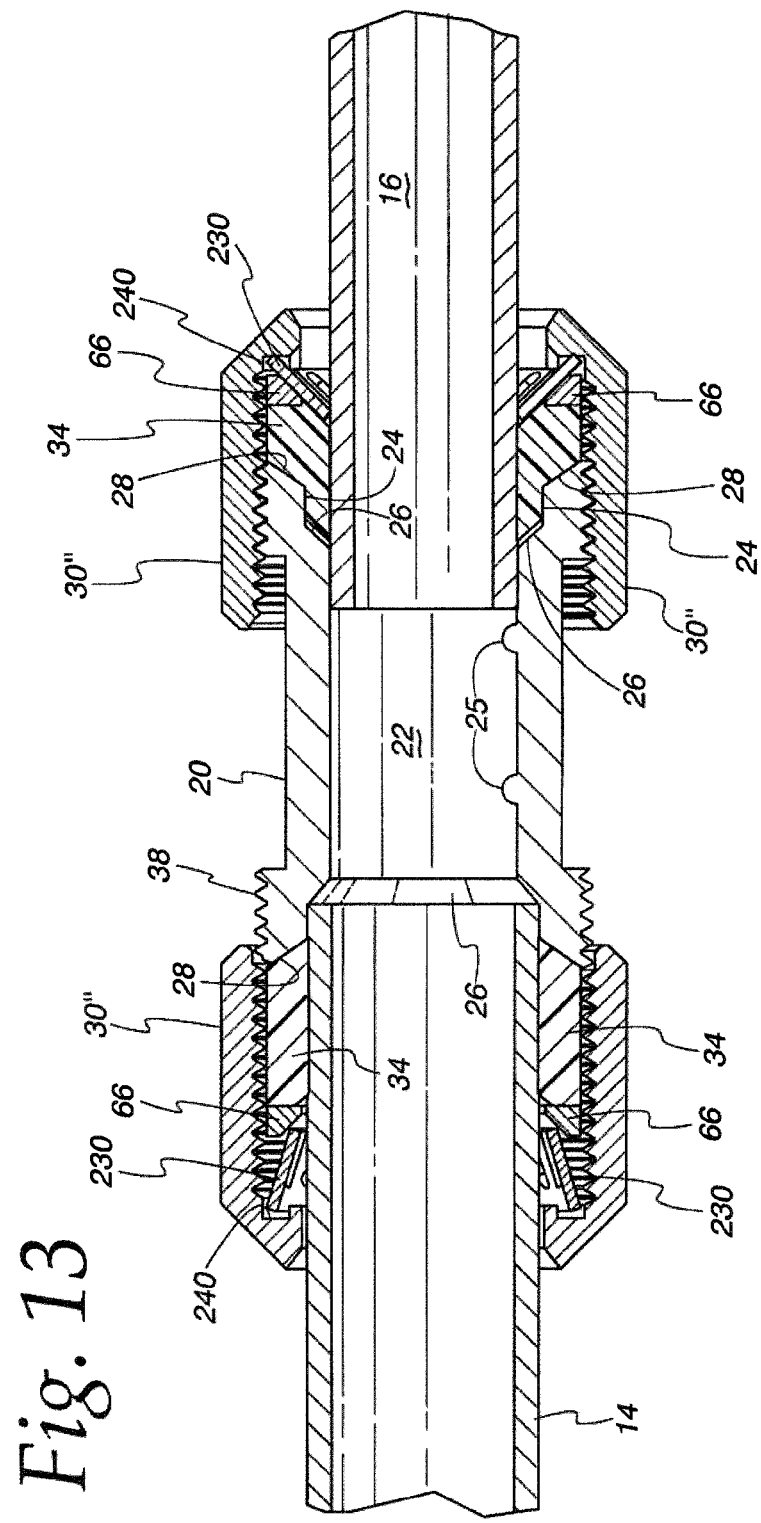
FIG. 13 is a cross-sectional view of a seventh embodiment of an improved compression fitting, similar to the FIG. 1 embodiment but with an alternate grip ring.
Figure 14:
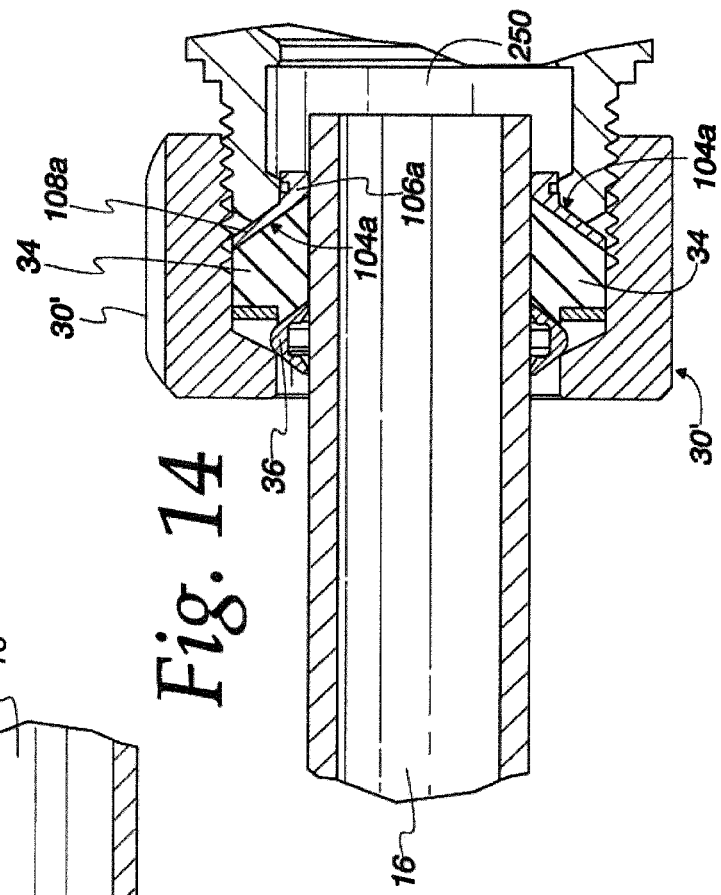
FIG. 14 is a cross-sectional view of an eighth embodiment of an improved compression fitting, securing a device such as a valve, adapter, nipple, pipe end, elbow, meter, meter setter, yoke fitting and pump.
Figure 15:
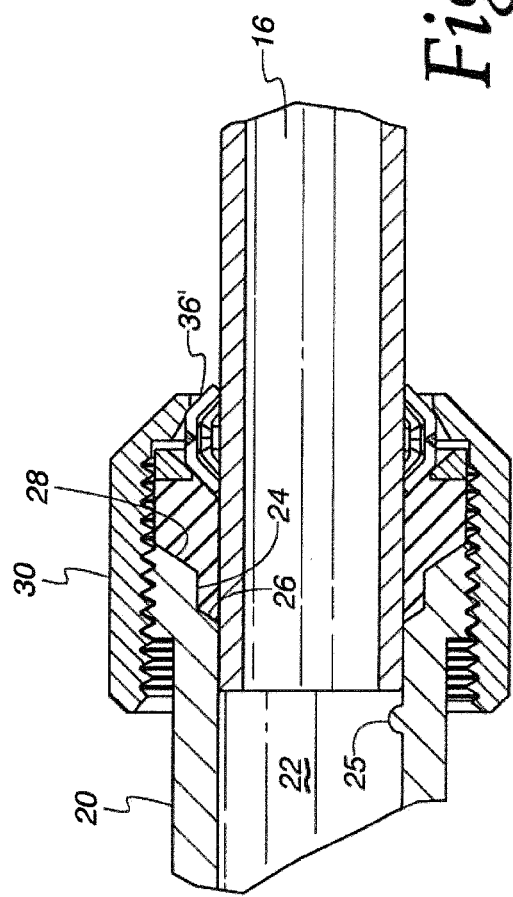
FIG. 15 is a cross-sectional view further illustrating the FIG. 1 compression fitting with a pipe having a diameter which is at the bottom of the acceptable diameter range for the compression fitting.

FIGS. 13-15 illustrate compression fittings with still further advantageous variations.

Specifically, FIG. 13 illustrates a compression fitting similar to FIG. 1 but with a tapered, asymmetric alternate grip ring 230. This grip ring 230 differs from the previously discussed grip rings 36 such as shown in FIGS. 2a-2d and 3 in that those grip rings 230 are mirrors or symmetrical in the axial direction on opposite sides of their spines. By contrast, the grip ring 230 of FIG. 13 is asymmetric in the axial direction. In this fitting, the fitting nut 30" includes an axial groove 240 around the rear interior of the nut 30" into which the large diameter end of the grip ring 230 is received. It should be appreciated that as the fitting nut 30" is tightened over the support body 20, the small diameter end of the grip ring 230 will be blocked by the washer 66, whereby the axial force applied by the large diameter end will apply a torque to the grip ring 230. The torque biases the small diameter end of the grip ring 230 toward tightly gripping around the pipe 14, 16.

While the asymmetric grip ring 230 of FIG. 13 could (as contrasted with the symmetric grip rings 36, 36') conceivably be installed backwards, the asymmetric grip ring 230 improves ease of pipe installation as the pipe can be stabbed into the fitting from slightly different angles not parallel with the fitting axis, or in situations with water flowing out of the pipe where it is more difficult to insert a pipe into the fitting end, since the asymmetric grip ring 230 effectively guides the pipe into the fitting.

FIG. 14 illustrates a compression fitting as disclosed herein as used to connect a device such as a valve, adapter, nipple, pipe end, elbow, meter, meter setter, yoke fitting, pump, etc. (generically illustrated at 250).

FIG. 15 further illustrates the compression fitting between the support body 20 and a small pipe 16 such as also illustrated in FIG. 1.

FIGS. 16 to 18 illustrate still further embodiments of blocking members which may be used such as previously described to close any gap between a coupling body 20/support sleeve 100 and a pipe 14, 16.

Specifically, as illustrated in FIG. 16, the support ring 104e may be C-shaped with a solid circular cross section, where circumferential length of ring 104e should be about the circumference of the outer surface of the associated pipe 16. As such, the ends of the C-shaped ring 104e would be brought together when secured in the compression fitting. Further, the cross-sectional diameter of the support ring 104e should be at least about as much as the largest designed gap between the pipe 16 and the inner surface of the coupling body 20/support sleeve 100.

FIGS. 17-18 illustrate other support rings 104f, 104g which extend at least a full 360 degrees so that there is some overlap, such as either the coil configuration in FIG. 17 or overlapping with a tongue and groove or the like as in FIG. 18. Overlapping such as in FIGS. 17-18 help to ensure that the support rings 104f, 104g will extend fully around the pipe 14, 16 for all pipe diameters, thereby ensuring that there is no unblocked gap through which the gasket 34 might be unloaded.

FIG. 19 illustrates one portion of a compression fitting in which a support ring 104 such as in FIGS. 16-18 may be used. Specifically, the support ring 104 may be embedded in the gasket 34' on the end facing the coupling body 20/support sleeve 100, which will ensure that the support ring (blocking member) 104 is properly located to prevent gasket unloading as described herein. Alternatively, it should be appreciated that the gasket 34' could include a notch around its inner surface at the corner adjacent the gap between the support body 100 and the pipe 16, with a suitable one of the support ring disposed in that notch to similarly be positioned to block the gap and prevent gasket unloading therethrough.

It should thus be appreciated that the compression fittings disclosed herein uniquely provide suitable, easy to assemble, and reliable compression fittings for a wide range of applications and sizes.

It should be further appreciated that while various embodiments are disclosed herein in which the transitions between support body steps 26, support body ends 28, grip ring sides 46, surface 60 of the fitting nut 30, washer 66 and blocking members 104 are tapered or sloped, it would be within the scope of some aspects of the present invention for such components to have not only straight conical tapers, but instead have curved tapers and still further could be surfaces which are perpendicular to the pipe axis and thus not tapered at all. As one example, as can be seen at the left end of FIG. 1, while the end surface 60 of the nut 30 is tapered, what is there biasing the grip ring 36' inwardly is the annular corner between the end surface 60 and a surface inside the fitting nut 30 which is perpendicular to the axis of the pipe 14. Thus, it should be appreciated that various shapes of surfaces of the grip ring sides 46 could cooperate with various shapes of fitting rings surfaces 60, with or without tapers and/or slopes, where such components cooperate so that tightening of the fitting nut 30 over the grip ring 36' in the direction of the pipe axis will bias the grip ring 36 inwardly to grip the pipe 14.

The invention claimed is:

1. A fitting for connecting a selected one of pipes having a range of outer diameters between a maximum diameter and a minimum diameter, comprising:
    a support body having an inner surface defining a fluid passage and an outer thread around one end of said support body;
    a washer adapted to fit over said selected pipe;
    a gasket adapted to fit over said selected pipe and between an end face of said support body and said washer;
    a grip ring encircling said selected pipe with said gasket and washer between said grip ring and said support body end, said grip ring including a spine substantially encircling said selected pipe, and
        alternating notches and teeth extending from at least one side of said spine; and
    a fitting nut encircling said grip ring, washer and gasket, said fitting nut having
        an inner thread threaded onto said support body outer thread, and
        an annular flange extending radially inwardly from an end of the fitting nut remote from the support body, wherein said grip ring, washer and gasket are between said support body one end and said fitting nut annular flange;
    wherein threading said fitting nut inner thread onto said support body outer thread draws said fitting nut annular flange toward said washer whereby said gripper teeth are biased toward engagement with said selected pipe and
    wherein said gasket surrounds an outer surface of said selected pipe and extends radially outward to engage an inner surface of said nut.

2. The fitting of claim 1, wherein said fitting nut annular flange has an inner diameter less than the outer diameter of the grip ring spine.

3. The fitting of claim 1, wherein threading said fitting nut onto the outer threads of the support body causes the fitting nut to translate axially toward the end of the select pipe over which it is secured.

4. The fitting of claim 1, wherein said support body inner surface includes a transition surface tapered axially from a first diameter to a second diameter, said second diameter being larger than said first diameter with said tapered transition surface second diameter being nearer said fitting nut annular flange than said tapered transition surface first diameter.

5. The fitting of claim 1, wherein said grip ring has a first set of teeth extending axially from one side of said spine and a second set of teeth extending axially from the other side of said spine.

6. The fitting of claim 1, wherein said washer has a central opening having a diameter less than an outer diameter of the grip ring.

7. The fitting of claim 1, wherein said gripper teeth when biased radially inwardly grip said selected pipe.

8. The fitting of claim 1, wherein said support body main body section is secured to one or more of a valve, adapter, nipple, pipe end, elbow, meter, meter setter, yoke fitting or pump.

9. The fitting of claim 1, wherein said grip ring has an outer diameter and said fitting nut includes an axial groove around the interior of the fitting nut end remote from the support body with said grip ring outer diameter received in said fitting nut axial groove.

10. A fitting for connecting a selected one of pipes having a range of outer diameters between a maximum diameter and a minimum diameter, comprising:
a support body having an inner surface defining a fluid passage and an outer thread around one end of said support body;
a washer adapted to fit over said selected pipe and including a central opening having a diameter;
a gasket adapted to fit over said selected pipe and between an end face of said support body and said washer;
a grip ring encircling said selected pipe with said gasket and washer between said grip ring and said support body end, said grip ring having
an outer diameter greater than the diameter of the washer central opening,
a spine substantially encircling said selected pipe, and
a plurality of teeth extending from at least one side of said spine; and
a fitting nut encircling said grip ring, washer and gasket, said fitting nut having
an inner thread threaded onto said support body outer thread, and
an annular flange extending radially inwardly from one end of the fitting nut remote from the support body, said fitting nut annular flange having an inner diameter less than the outer diameter of the grip ring spine, wherein said grip ring, washer and gasket are between said support body one end and said fitting nut annular flange;
wherein threading said fitting nut onto the outer threads of the support body causes the fitting nut to translate axially toward the end of the select pipe over which it is secured whereby said gripper teeth are biased toward engagement with said selected pipe and
wherein said gasket surrounds an outer surface of said selected pipe and extends radially outward to engage an inner surface of said nut.

11. The fitting of claim 10, wherein said grip ring has a first set of teeth extending axially from one side of said spine and a second set of teeth extending axially from the other side of said spine.

12. The fitting of claim 10, wherein said gripper teeth when biased radially inwardly grip said selected pipe.

13. The fitting of claim 10, wherein said support body main body section is secured to one or more of a valve, adapter, nipple, pipe end, elbow, meter, meter setter, yoke fitting or pump.

14. The fitting of claim 10, wherein said grip ring has an outer diameter and said fitting nut includes an axial groove around the interior of the fitting nut end remote from the support body with said grip ring outer diameter received in said fitting nut axial groove.

15. A compression fitting for connecting a first pipe to a second pipe, said first pipe having an outer first diameter and said second pipe having an outer second diameter, said first diameter being equal to or greater than said second diameter, comprising:
a support body substantially tubular around an axis and having a central body section between opposite end sections, said central body section having an inner surface defining a fluid passage, each of said support body opposite end sections having
a first inner surface,
an end face, and
a transition surface between said central body section inner surface and each of said support body end section first inner surfaces;
at least one gasket adapted to fit over one of said first and second pipes and engage said support body end section end face;
a grip ring encircling said one of said first and second pipes with said gasket between said grip ring and said one support body end section end face, said grip ring having an outer diameter;
a washer encircling said one of said first and second pipes with said washer between said grip ring and said at least one gasket; and
at least one fitting nut encircling said grip ring and said at least one gasket, said fitting nut including an axial groove around the interior of the fitting nut end remote from the support body with said grip ring outer diameter received in said fitting nut axial groove;
whereby axial movement of said fitting nut toward said support body main body section directly engages said at least one fitting nut against said at least one grip ring whereby said at least one grip ring is biased radially inwardly against said selected pipe in a compression position in which
said grip ring secures said selected pipe in said support body, and
said grip ring retains said gasket inside said fitting nut between said grip ring and said one support body end section end face,
wherein said support body end section end faces are tapered outwardly from the support body end and
wherein said gasket surrounds an outer surface of said selected pipe and extends radially outward to engage an inner surface of said nut.

16. The fitting of claim 15, wherein:
said grip ring includes a spine with alternating notches and teeth extending from at least one side of said spine;
said washer has a central opening with an inner diameter less than said grip ring outer diameter; and
said axial movement of said fitting nut toward said support body main body section pushes said grip ring through said washer central opening to engage said grip ring teeth with said washer and bend said grip ring teeth radially inwardly.

* * * * *